United States Patent [19]

Heidt

[11] 4,051,227
[45] Sept. 27, 1977

[54] METHOD FOR REDUCING URANIUM TETRAFLUORIDE

[75] Inventor: Henry M. Heidt, Lynchburg, Va.

[73] Assignee: The Babcock & Wilcox Company, New York, N.Y.

[21] Appl. No.: 700,377

[22] Filed: June 28, 1976

Related U.S. Application Data

[60] Division of Ser. No. 444,624, Feb. 22, 1974, Pat. No. 3,979,499, which is a continuation of Ser. No. 17,682, March 9, 1970, abandoned.

[51] Int. Cl.² .................................................. C01G 43/06
[52] U.S. Cl. ............................................................ 423/259
[58] Field of Search ........................ 423/253, 259, 261

[56] References Cited

U.S. PATENT DOCUMENTS

| | | | |
|---|---|---|---|
| 3,164,440 | 1/1965 | Levey | 423/259 |
| 3,235,327 | 2/1966 | Blundell et al. | 423/261 |
| 3,413,099 | 11/1968 | Rode | 423/259 |
| 3,765,844 | 10/1973 | Rode | 423/253 |
| 3,979,499 | 9/1976 | Heidt | 403/259 |

Primary Examiner—Edward A. Miller
Attorney, Agent, or Firm—J. M. Maguire; J. P. Sinnott

[57] ABSTRACT

A pulsed flow process for the reduction of $UF_6$ where the process may be continuous or batch starting without a seed bed. The initial amplitude and frequency of the pulsed flow is altered as a bed of particle-form material is formed and thereafter the particle-form product of the reaction is removed from the reaction zone.

1 Claim, 1 Drawing Figure

U.S. Patent     Sept. 27, 1977     4,051,227
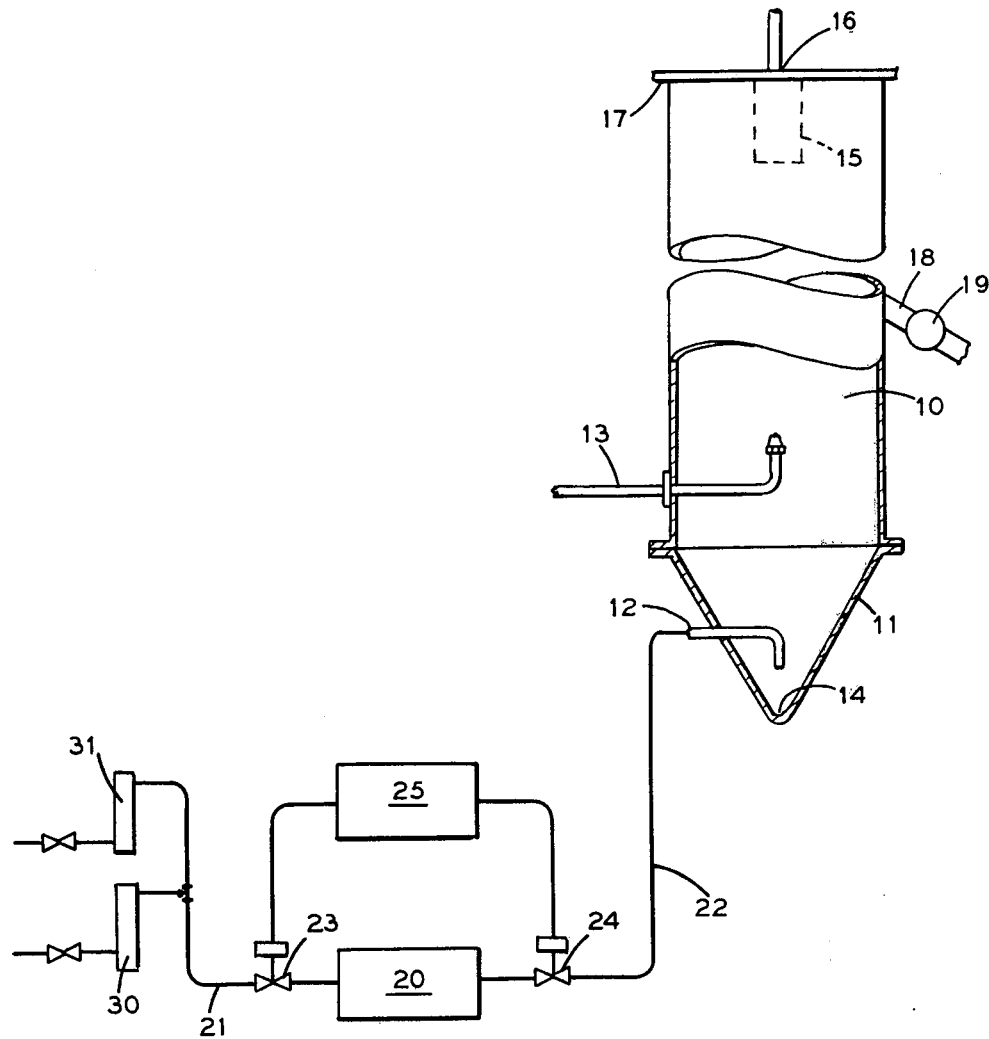

METHOD FOR REDUCING URANIUM TETRAFLUORIDE

This is a division of application Ser. No. 444,624, filed 2/22/74 and now U.S. Pat. No. 3,979,499, which is a continuation of application Ser. No. 17,682 filed 3/9/70, and now abandoned.

The present invention relates to an improved process for converting uranium hexafluoride to uranium tetrafluoride, uranyl fluoride and other intermediate products, and more particularly to an improved reaction process to reduce uranium hexafluoride by a pulsed flow of reactant medium in a confined vessel which avoids the need for an initial seedbed in the usual fluidized bed process.

In the production of nuclear fuels of a ceramic grade $UO_2$ one of the intermediate processes has been the reduction of gaseous uranium hexafluoride to solid uranium tetrafluoride or uranyl fluoride. This portion of the overall production process has heretofore been accomplished in a more or less standard type fluidized bed where a seedbed of the reduced solid, such as uranium tetrafluoride or uranyl fluoride has been used, with additional reduced solids from the uranium hexafluoride depositing on the seedbed particles. With such a procedure the deposition on the seedbed leads to the generation of oversized particles of the reduced material necessitating recycling of a portion of the particle bed to maintain proper bed fluidization. Moreover, after conversion of the particles to uranium dioxide the product must be pulverized to a useable size. All of these procedures increase costs of production of ceramic grade nuclear fuels.

In the present invention it has been found that a pulsed flow fluidized bed type reactor can be used without the initial use of a seedbed. Eliminating the initial seedbed also reduces or eliminates the need for recycling and pulverization of the oversized uranium tetrafluoride or other conversion products such as $UO_2F_2$. Moreover, the fluid flow rate to the reaction zone can be increased over values hereinbefore in use with an accompanying increase in the rate of conversion or reduction of the $UF_6$ to the intermediate products. After the reduction of the uranium hexafluoride the solid intermediate particles are separated from the system gases by passing the gas - solids mixture through filters with the gases leaving the reactor.

The single FIGURE of the drawings illustrates a somewhat schematic diagram of apparatus suitable for performing the process of this invention.

In the illustrated embodiment of the invention, the reaction or reduction zone is defined by a vessel 10 which is formed in the shape of a hollow upright cylinder. The vessel is provided with a generally inverted frusto-conical bottom portion 11 into which is admitted the reducing medium through an inlet pipe 12. It will be noted the pipe 12 discharges coaxially downwardly intermediate the height of the bottom portion 11 of the vessel for the introduction of the reducing medium in a pulsed flow pattern, as hereinafter described. The reducing medium which may be a gas or vapor or a gaseous mixture, as hereinafter described, is directed downwardly against the internal surface 14 of the end of the frusto-conical bottom portion 11 for upward deflection in distributed flow across the cross-sectional extent of the vessel 10.

A pipe 13 projects through the wall of the vessel 10 and is used for the introduction of the gaseous uranium hexafluoride. The pipe 13 is positioned with an upwardly directed outlet end coaxialy with respect to the vessel 10 and above the frusto-conical bottom portion 11 for diffusion of the gas throughout the horizontal cross-section of the reactor vessel.

The upper portion of the vessel is provided with one or more filters 15 of known construction, preferably constructed of Monel metal to separate the particulates formed in the reduction zone from the effluent gases. The effluent gases pass through an opening 16 or openings in the top 17 of the vessel 10 for further treatment or disposal, as desired.

In the embodiment shown the reactor vessel 10 is arranged for continuous reduction of uranium hexafluoride by a pulsed flow of reactant medium, and is provided with an overflow discharge pipe 18 positioned in the wall for the removal of particles from the reactor. Advantageously, the pipe 18 is provided with a sealing arrangement, such as a star feeder 19 or the like, to minimize the loss of reactant medium or gaseous effluents while permitting the removal of reduced solids from the reactor.

It will be understood the process for the reduction of uranium hexafluoride as hereinafter described may be operated as a continuous or batch process. In either circumstance, the vessel 10 and the bottom portion 11 will be separable. In a batch process the overflow pipe 18 could be omitted or rendered inoperative by non-operation of the star feeder 19.

As shown, the pulsed admission of the reducing medium is regulated and controlled by a mechanism which includes a pressure vessel 20 having an inlet pipe 21 interconnecting the vessel 20 with, for example, separate sources 30 and 31 for supply of gases or vapors used as a reducing medium in the reactor vessel. The outlet side of the pressure vessel 20 is connected by a valved pipe 22 opening to the pipe 12 arranged to discharge the medium into the vessel 10. The valves 23 and 24, positioned respectively in pipes 21 and 22, are of the quick open and closing type controlled by a cycling mechanism indicated by the numeral 25.

To attain the pulsed action desired within the vessel 10 the valves 23 and 24 are actuated electrically or mechanically from the mechanism 25, which is of known type. Ordinarily, the valves 23 and 24 are simultaneously actuated so that as one opens the other closes, although it will be understood a time lag may be utilized so that the actuation of the valves need not be simultaneous. The choice of operation is somewhat dependent upon the frequency and amplitude of pulsed medium flow to the reaction zone of the reaction vessel 10.

In the operation of the apparatus, gaseous uranium hexafluoride is continuously introduced through the pipe 13 to the reaction vessel 10. At the same time, a pulsed flow of steam and nitrogen is introduced through the pipe 12 so as to ascend through the vessel 10 in contact with the uranium hexafluoride gas. The reducing action of the steam at the preferred temperatures, produces fine solid particles of uranyl fluoride.

The reaction of $UF_6$ with steam at a temperature in the range of 450° to 600° F, and preferably at 540° to 550° F, is rapid when substantially theoretical quantities are involved and intimate mixing occurs, as with pulsed flow conditions in the reactor. An inert gas such as nitrogen is mixed with the steam to provide the volume necessary for the pulsed flow action in the reactor. In the early stages of operation of the process the initially formed fine particles of $UO_2F_2$ will rise in the reactor with the introduction of the pulsed flow of the reactant medium (steam and nitrogen) and will tend to fall in the reactor when the pulse flow stops in its normal cyclic action. Each pulse will add further solids in the reactor, with a slight increase in the size of the earlier formed particles of $UO_2F_2$, until an apparent bed of particles has been formed. The depth of the apparent bed will then be determined (or limited) by particle withdrawal through the overflow pipe 18. Loss of particles from the reactor is avoided by the filters 15. Heat is provided for the most favorable reaction temperature by heating the incoming streams of fluid, particularly by superheating the steam, and if necessary, by heating the walls of the vessel 10. During the initial buildup of the particle bed in the reactor the pulse amplitude and frequency will be changed by adjustment of the control mechanism 25, usually by a gradual increase in the amplitude and a gradual reduction in the frequency of the pulse. Ordinarily the total volume of the flow through the reactor will remain substantially uniform throughout the operating period.

While I prefer to pulse only the flow of the reactant medium, it would be possible to also pulse the flow of $UF_6$ to the reactor. No advantage has been found in pulsing both fluids and the control complication for such a mode of operation does not seem to be justified.

As described, the operations of the reactor are continuous for an indefinite period of time and the fine particles so produced are of a desirable size for further processing to form $UO_2$ suitable for nuclear fuels. The process may also be operated on a batch basis, to further limit the size of the product particles.

It will be appreciated that a batch process procedure could be used to produce $UO_2F_2$ particles, and the reactant material changed to reduce the intermediate product to $UO_2$. However, the further reduction of the uranyl fluoride would involve higher temperatures, such as 1500° F, with a hydrogen containing reactant, and for relatively long periods of time i.e., 6–8 hours.

I prefer to operate the process continuously as described to produce the $UO_2F_2$ and to accomplish the further reduction in separate vessels or reactors.

In a similar process to that described in connection with the production of uranyl fluoride, the UF6 can be converted to $UF_4$ particles. Under such circumstances a slightly higher temperature is preferred, of the order of 600° F, and the reactant medium would be an organic halide such as freon or the like. Under such circumstances the reaction would be $UF_6 + F_2C = CF_2 \rightarrow UF_4 + F_3C - CF_3$. Such a reaction can also be carried out on a continuous or batch basis.

EXAMPLE 1

Reaction vessel —4 inch diameter
Vessel status — empty at run start (no seed bed)
Run gas flows:
 $N_2$ —120 cfh
 $H_2O$ — 730 cfh
 $UF_6$ — 60.0 lb/hr
Reactor temperature — 500 - 500° F
Starting pulse amplitude — 5 psig frequency 30 cpm
Final pulse amplitude — 15 psig frequency 17 cpm
The pulse frequency and amplitude are changed as the bed comes into existence and the final pulse conditions are achieved in 50–60 minutes. Product take-off begins also at this time. Product is $UO_2F_2$— 90 w/o less than 10 microns.

EXAMPLE 2

Vessel status — empty at run start (no seed bed)
Run gas flows:
 $N_2$ — 315 cfh
 $H_2O$ — 540 cfh
 $UF_6$ — 44 lbs/hr
Reactor temperature — 530 - 570° F
Starting pulse amplitude — 6 psig frequency 28 cpm
Final pulse amplitude — 17 psig frequency 17 cpm
Final pulse conditions were achieved in 70 - 85 minutes and product take-off was started.

What is claimed is:

1. A process for the treatment of uranium hexafluoride which comprises the steps of passing a flow of gaseous uranium hexafluoride to a reaction zone, passing a pulsed flow of a gaseous reactant medium comprising an organic halide into the reaction zone to maintain a zone temperature on the order of 600° F and a pressure slightly above atmosphere to enable the uranium hexafluoride to initially form only from said gases fine solid particles containing substantially only $UF_4$, continuing the treatment of the uranium hexafluoride within said reaction zone to increase the size of the formed fine particles and to accumulate further fine particles in the reaction zone, and adjusting the rate of pulsed flow of reactant medium to the reaction zone by increasing the pressure of the reactant medium to a maximum pressure about twice atmospheric while simultaneously reducing the frequency of the pulsed flow in accordance with the amount of solid particles therein.

* * * * *